United States Patent [19]

Anderson et al.

[11] 4,314,757
[45] Feb. 9, 1982

[54] PHOTOGRAPHIC PRINTER WITH AUTOMATIC PAPER SPLICE DETECTOR

[75] Inventors: Richard D. Anderson, Maple Grove; Jess F. Fauchier, II, Crystal; Francis M. Laciak, Brooklyn Park, all of Minn.

[73] Assignee: Pako Corporation, Minneapolis, Minn.

[21] Appl. No.: 186,215

[22] Filed: Sep. 11, 1980

[51] Int. Cl.³ .................... G03B 29/00; G03B 27/52
[52] U.S. Cl. ..................................... 355/29; 355/50; 226/45; 242/188
[58] Field of Search ................. 355/28, 29, 40–43, 355/50, 51; 250/557, 561, 559, 571; 242/186, 188; 226/24, 45

[56] References Cited
U.S. PATENT DOCUMENTS 3,511,565  5/1970  Harman, Jr. et al. ............... 355/56
4,236,815 12/1980  Anderson et al. ................... 355/29
4,239,377 12/1980  Kasmussen, Jr. ..................... 355/29

Primary Examiner—L. T. Hix
Assistant Examiner—W. J. Brady
Attorney, Agent, or Firm—Kinney, Lange, Braddock, Westman and Fairbairn

[57] ABSTRACT

A photographic printer includes a splice detector for detecting the presence of a splice in a photographic paper web. The splice detector is positioned upstream of the printing aperture of the printer, and provides a signal indicative of the presence of a paper splice prior to the time that the splice reaches the printing aperture. Following detection of the splice, the paper feed control of the printer advances the web a number of additional feeds sufficient to advance the splice past the printing aperture. As a result, recording of a photographic image on the portion of the print paper web containing the splice is avoided.

5 Claims, 4 Drawing Figures

PHOTOGRAPHIC PRINTER WITH AUTOMATIC PAPER SPLICE DETECTOR

BACKGROUND OF THE INVENTION

1. Field of the Invention

The present invention relates to photographic printers. In particular, the present invention is an improvement to a photographic printer which avoids waste and loss of productivity by preventing the printer from recording a photographic image on a portion of a print paper web containing a paper splice.

2. Description of the Prior Art

In commercial photographic processing operations, high rates of processing must be achieved and maintained in order to operate profitably. To expedite the photographic processing, orders containing film of similar type and size are spliced together for developing. After developing of the photographic film, a photographic printer records the photographic images in edge-to-edge relationship on a continuous web of photosensitive print paper by the photographic printer. In this type of photographic printer, the print paper web is typically advanced by a predetermined feed length during each operating cycle of the printer in order to advance the next unexposed portion of the print paper web to a printing aperture. High intensity light is passed through the film and imaged on the image area of the photographic print paper defined by the printing aperture to expose the photographic emulsion layers of the paper and record a photographic image.

After leaving the printer, the print paper web is photoprocessed to produce prints. A photographic paper cutter then cuts individual prints from the photographic web; the prints are sorted by customer order; and the prints and the corresponding film segments are packaged and sent to the customer.

One problem which has been encountered in the past is caused by the occurrence of paper splices in the web of photographic print paper. The paper splices are necessary, of course, in order to provide a web of the desired length. As the speed of photographic printers is increased and the capability of printing larger numbers of photographic prints is achieved, the problem of paper splices also increases.

In particular, a significant loss in productivity occurs when a photographic image is recorded on a portion of the print paper web containing a paper splice. The resulting photographic print is unsatisfactory, and cannot be sold to a customer. As a result, this photographic print must be remade in order to complete the customer's order. Remake prints typically are handled on a less automated basis than normal first-run production prints. The correct portion of film must be located, and the remake print must be produced, often on an individualized, and thus far less efficient basis.

It is necessary according to National Standards to provide a splice warning slot in the print paper web which precedes the splice. Both the splice and the slot can vary substantially in dimensions and relative position. In some prior art photographic printers, a sensor has been provided to sense the slot which precedes the paper splice. When the sensor detects a splice warning slot, an indication light is lit, warning the operator that a paper splice has been encountered. The operator then may take whatever action he wishes to avoid printing on the splice.

SUMMARY OF THE INVENTION

The present invention is an improvement to photographic printers which avoids the lost production time and inefficiencies which occur if a photographic image is recorded on a portion of a print paper web containing a paper splice. In the present invention, splice detector means are positioned along a path of the web prior to the printing aperture of the photographic printer. The splice detector means detects the presence of the splice in the web, and provides a signal indicative of the presence of the splice prior to the splice reaching the printing aperture. When a signal is received from the splice detector means, the paper feed means automatically advances the web so that a photographic image is not recorded on a portion of the web containing the paper splice.

By preventing the photographic printer from recording a photographic image on a portion of the web containing the paper splice, significant savings in production time are achieved. The present invention is based upon the recognition that although a small amount of print paper may be wasted by advancing the web so that the paper splice is past the print gate, the cost of this wasted paper is far outweighed by the savings in production time and cost of not having to remake a print which had been recorded on a paper splice.

DETAILED DESCRIPTION OF THE PREFERRED EMBODIMENTS

Figure 1:
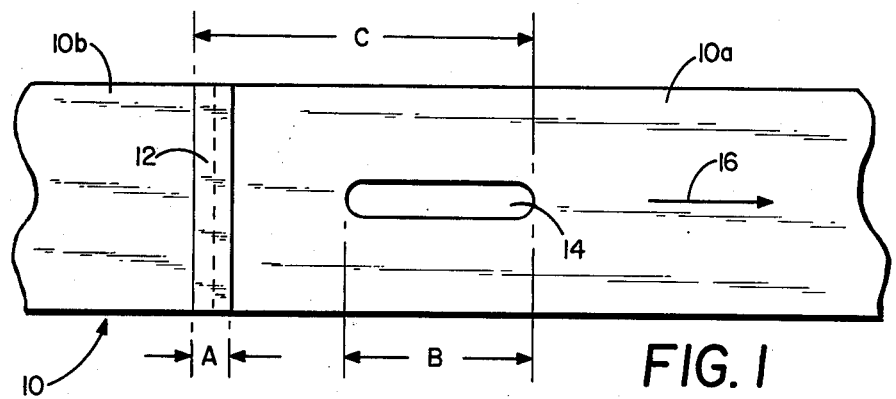
FIG. 1 shows a web of photographic print paper containing a paper splice and a splice warning slot.

FIG. 1 shows web 10 of photographic print paper which is formed by portions 10a and 10b. Paper splice 12 joins portions 10a and 10b. Splice warning slot 14 is located in portion 10a proximate and ahead of splice 12. The direction of longitudinal travel of web 10 is illustrated by arrow 16 in FIG. 1. Thus as web 10 is advanced, splice warning slot 14 precedes splice 12.

The dimensions and relative positions of splice 10 and slot 14 vary substantially from manufacturer to manufacturer. The length A of splice 12, for example, can vary from as little as ¼ inch to as much as 1½ inch. The length B of slot 14 also typically varies from about 2½ to about 3½ inches in length. The distance C from the leading edge of slot 14 to the trailing edge of splice 12 varies from as little as 3¼ inches to as much as 10¼ inches.

Any photographic print which is printed over either splice 12 or splice warning slot 14 will, of course, be unsuitable. In that event, the photographic print must be remade in order to complete the customer's order. The remaking of prints delays completion of the customer's order, often requires far greater amount of labor, and in general reduces efficiency and increases cost to the photofinisher.

Figure 2:
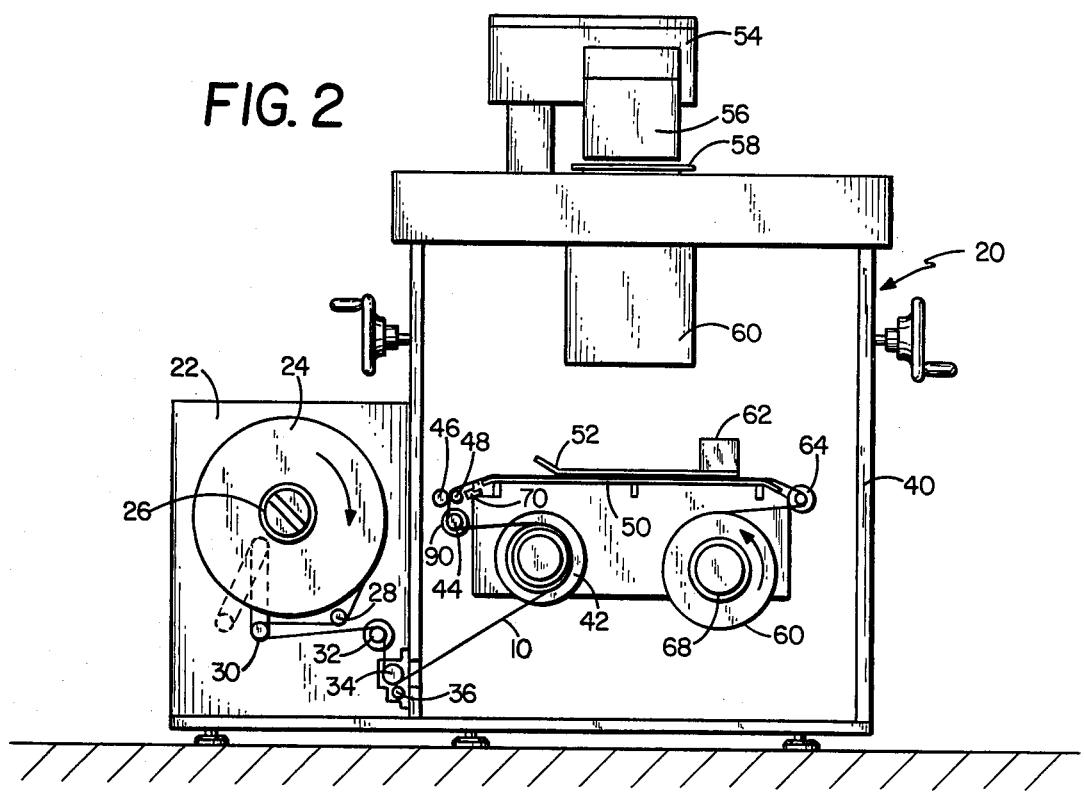
FIG. 2 shows a paper supply system of a photographic printer utilizing the present invention.
Figure 3:
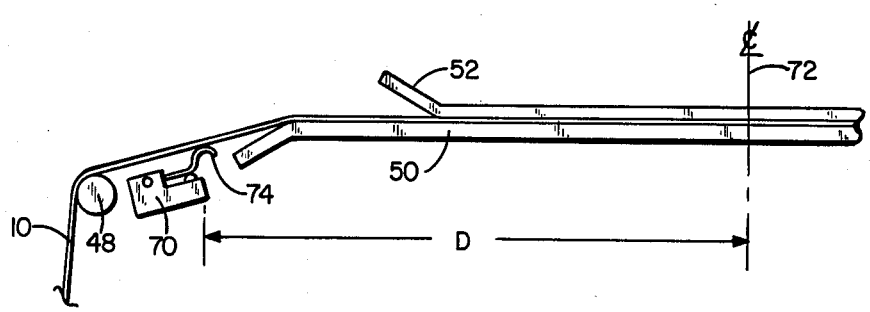
FIG. 3 is a detailed view of the paper supply system of FIG. 2, showing the position of the splice sensor with respect to the optical center line of the photographic printer.
Figure 4:
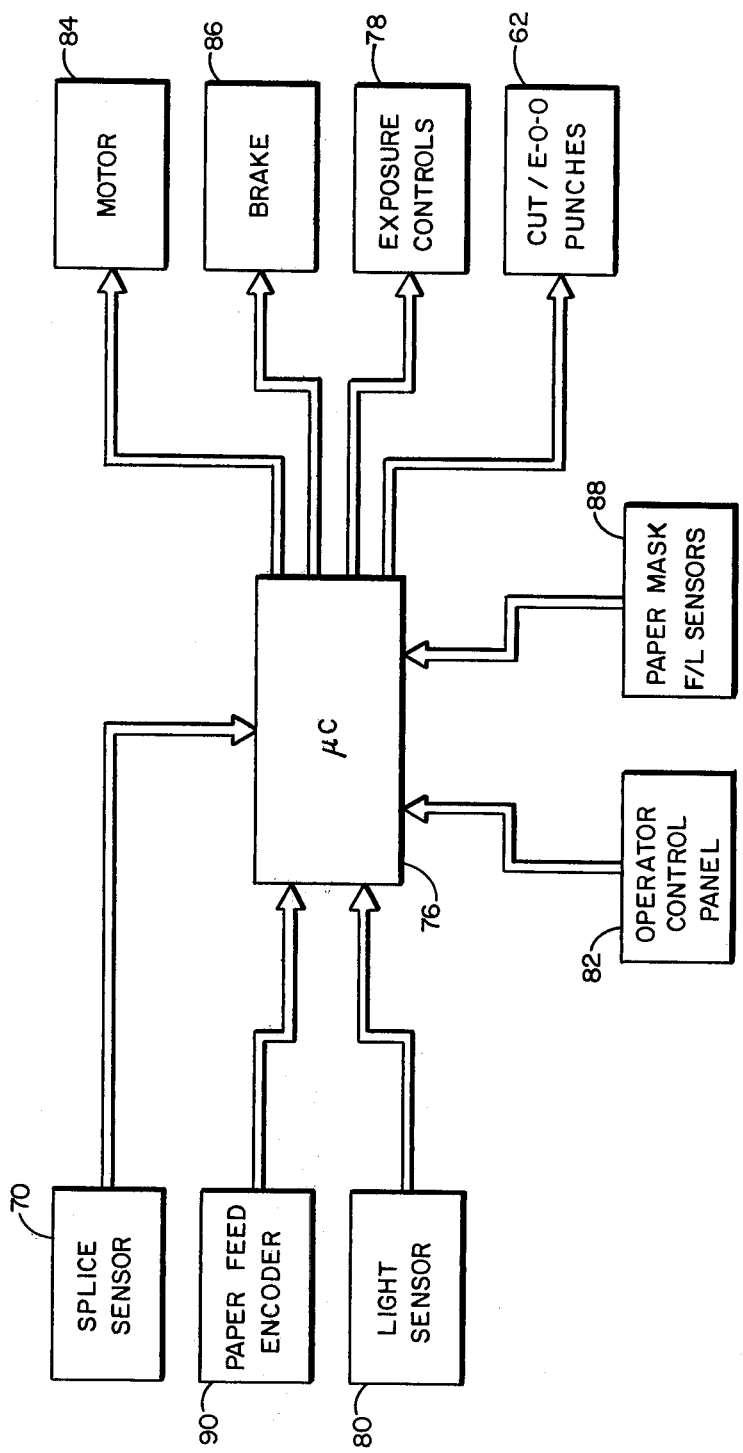
FIG. 4 is an electrical block diagram of the paper feed control system of the printer of FIG. 2.

The photographic printer shown in FIGS. 2, 3 and 4 includes a paper supply system in which warning slots 14 are sensed, and paper feeds are controlled so that printing on splice 12 or slot 14 is avoided.

In FIG. 2, the paper feed system of photographic printer 20 is illustrated. Printer 20 includes a large paper supply housing 22. Roll 24 of unexposed print paper web 10 is mounted on supply spindle 26. Paper web 10 is fed from roll 24 over idler roller 28, bale arm 30, and idler roller 32, and between light lock rollers 34 and 36. Paper web 10 passes from light lock rollers 34 and 36 through opening 38 and into main housing 40 of printer 20.

Once within housing 40, paper web 10 passes over paper guide idler spool 42, over idler roller 44, between idler roller 46 and feed metering roller 48, and onto paper deck 50. As paper web 10 is transported across the upper surface of paper deck 50, it passes under paper mask assembly 52, which has a printing aperture. The printing aperture defines an image area of print paper web 10 which is exposed to a photographic image. Light from lamp house 54 is directed downward by light mixing chamber assembly 56, passes through a negative in neghold 58, and is focused by optics 60 onto the image area defined by paper mask 52.

Mounted proximate the print gate is punch marking assembly 62, which produces cut and end-of-order indicia on paper web 10. These indicia are later used by an automatic print cutter to sever individual prints from paper web 10 (after web 10 has been developed).

Paper web 10 advances from the print gate across paper deck 50, over idler roller 64, and onto takeup roll 66 on takeup spool 68.

The paper feed system of the present invention also includes splice sensor switch 70, which is positioned between metering roller 48 and paper deck 50. As shown in FIG. 3, switch 70 is located at distance D from the optical center line 72 of printer 20. In the preferred embodiment shown in FIG. 3, switch 70 is a lever switch having an actuator arm 74 which is normally held down as paper web 10 passes over roller 48, over arm 74, and onto paper deck 50. Whenever a splice warning slot 14 in paper 10 passes over switch 70, arm 74 is permitted to move upward, thereby causing switch 70 to change state.

FIG. 4 is an electrical block diagram of the control system of printer 20. Microcomputer 76 controls exposures of photographic images on paper web 10 through exposure controls 78, which typically include a shutter paddle and filters. Exposures are controlled as a function of input signals received by microcomputer 76 from light sensors 80 and operator control panel 82, together with stored exposure control information stored in memory by microcomputer 76. Light sensors 80 are, in one preferred embodiment, large area transmission density (LATD) sensors. Operator control panel 82 preferably includes various operator controlled switches, through which the operator can select various modes of operation of printer 20, and a keyboard through which the operator can enter information and initiate operation of printer 20.

In the preferred embodiment of the present invention illustrated in FIGS. 2 and 4, takeup spool 68 is driven by motor 84. Brake 86 controls movement of paper guide spool 42. Microcomputer 76 controls operation of motor 84 and brake 86 during each paper feed cycle. The control of paper feed by microcomputer 76 is as a function of paper feed length information supplied by either operator control panel 82 or paper mask feed length sensors 88. Microcomputer 76 monitors the advancement of paper web 10 as motor 86 drives web 10 by means of paper feed encoder 90. In a preferred embodiment of the present invention, paper feed encoder 90 includes a slotted encoder wheel mounted on feed metering roller 48, and an optical sensor which provides a pulse each time a slot passes. By counting pulses from paper feed encoder 90, microcomputer 76 monitors the paper feed distance. When the number of counts from paper feed encoder 90 corresponds to the desired feed distance, microcomputer 76 stops motor 84 and applies brake 86.

Microcomputer 76 also controls cut and end-of-order punches 62. A cut mark is produced for each print, and an end-of-order mark is produced to indicate the end of each customer's order.

During normal automatic operation of printer 20, microcomputer 76 initiates paper feeds, and a stored feed length count is decremented by microcomputer 76 each time a pulse from paper feed encoder 90 is received. When the feed length count has been decremented to zero, microcomputer 76 stops motor 84 and energizes brake 86.

During each paper feed, the signal from splice sensor 70 is monitored by microcomputer 76. When the signal from splice sensor 70 first changes, indicating that a splice warning slot 14 has been detected, the number of counts remaining in this paper feed is stored. Microcomputer 76 calculates the number of successive additional paper feed cycles necessary to advance splice 10 and slot 14 past the printing aperture. In a preferred embodiment of the present invention, microcomputer 76 determines the number of additional feeds by the following relationship:

$$\#\text{Feeds} = \frac{C_{MAX} + D + \frac{1}{2} \text{ feed length - counts remaining}}{\text{feed length}}$$

where $C_{MAX}$ equals the maximum distance possible from the leading edge of slot 14 to the trailing edge of splice 12, and D equals the distance from sensor 70 to optical center line 72. The number of additional feeds calculated by microcomputer 76 is rounded up to the next whole number. Microcomputer 76 then initiates this calculated number of paper feeds in order to advance slot 14 and splice 12 past the printing aperture. During these additional paper feeds, microcomputer 76 inhibits any exposure from being produced. Commands entered through operator control panel 82 which attempt to initiate an exposure cycle are inhibited by microcomputer 76. Some commands, however, may be accepted during this time period. For example, in one preferred embodiment of the present invention, microcomputer 76 permits the operator to enter density and color button corrections through operator control panel 82 during the additional paper feeds. These corrections are used in controlling exposure during the exposure cycle, following the additional feeds. During the time when additional paper feeds are being made, cut marks are being produced by punch marking apparatus 62 if the control switches of operator control panel 82 have selected a mode in which the punches operate. Since each additional paper feed is the normal feed length for a print, the blank prints which are produced as a result of the additional paper feeds are of the same length as all of the other prints. This avoids any problem in handling odd sized blank prints with an automatic print cutter and sorter.

After the additional feeds advance the splice 12 and splice warning slot 14 past the print gate, operation of printer 20 returns to normal. If a print cycle had been initiated during the last normal paper feed, a print cycle automatically starts. If the splice warning slot 14 was detected during the middle of a multiple print sequence, the additional feeds are made, and the multiple print cycle sequence is then continued.

In another preferred embodiment of the present invention, microcomputer 76 determines whether one or more paper feed cycles and exposure cycles can occur before splice 12 and slot 14 reach the printing aperture. In some cases, of course, no feeds or exposures are possible, depending upon when the leading edge of slots 14 reaches sensor switch 70, and the feed length being used.

The length available for the next paper feed after splice warning slot 14 has been detected is D—½ feed length—counts remaining. This length must exceed the feed length, i.e. D—½ feed length—counts remaining ≧ feed length.

Based upon the distance D, the feed length, and the counts remaining when the leading edge of slot 14 is detected, microcomputer 76 determines how many exposures and paper feed cycles can be completed before splice warning slot 14 reaches the printing aperture.

In this embodiment, microcomputer 76 also determines the number of additional feeds required to move slot 14 and splice 12 past the print gate. The number of feeds is dependent upon the distance $C_{MAX}$, the distance D, ½ the feed length, the counts remaining when the leading edge of slot 14 was detected, and the number of normal paper feeds/exposure cycles inserted after slot 14 was first detected.

In conclusion, the paper feed system of the present invention automatically prevents the photographic recording of images onto the portion of the print paper web containing a splice or a splice warning slot. By determining where in a paper feed cycle the splice warning slot is first sensed, the printer provides additional paper feeding to advance the slot and splice past the printing aperture, while minimizing the waste of print paper.

Although the present invention has been described with reference to preferred embodiments, workers skilled in the art will recognize that changes may be made in form and detail without departing from the spirit and scope of the invention.

What is claimed is:

1. A photographic printer of the type in which photographic images are recorded on a web of photographic paper, and in which the photographic paper web may contain a paper splice, with a splice warning slot preceding the splice, the photographic printer comprising:
   means for defining a printing aperture;
   paper feed means for advancing the photographic paper web a predetermined feed length during each paper feed cycle to advance an unexposed portion of the web to the printing aperture;
   exposure means for exposing the web at the printing aperture to record a photographic image during each exposure cycle;
   splice sensor means positioned along the path of the web upstream from the printing aperture for sensing the presence of the splice warning slot and providing a signal indicative of the presence of a paper splice in the web; and
   control means for controlling the paper feed means and the exposure means in response to a signal from the splice sensor means to cause the paper splice to be advanced past the printing aperture by moving the print paper in integral feed lengths without a photographic image being recorded on a portion of the web containing the paper splice, wherein the control means determines the number of paper feed cycles which can be completed before the splice warning slot reaches the printing aperture, and permits normal operation of the printer until the determined number of exposure and paper feed cycles has been completed; and then advances the paper, while inhibiting exposure cycles, by causing the paper feed means to initiate an additional number of paper feed cycles to advance the paper splice past the printing aperture.

2. The invention of claim 1 and further comprising:
   paper feed sensing means for sensing advancement of the paper web by the paper feed means during each paper feed cycle.

3. The invention of claim 2 wherein the control means determines the number of normal exposure and paper feed cycles that can be completed before the splice warning slot reaches the printing aperture as a function of the feed distance remaining in a paper feed cycle when the splice sensor means first provides the signal indicating the presence of the splice warning slot, and the position of the splice sensor means with respect to the printing aperture.

4. The invention of claim 1 and further comprising:
   cut indicia producing means positioned proximate the printing aperture for providing cut indicia on the web indicating desired cut locations for severing individual prints from the web.

5. The invention of claim 4 wherein the cut indicia producing means continues to operate during the additional paper feed cycles.

* * * * *